Patented Feb. 3, 1953

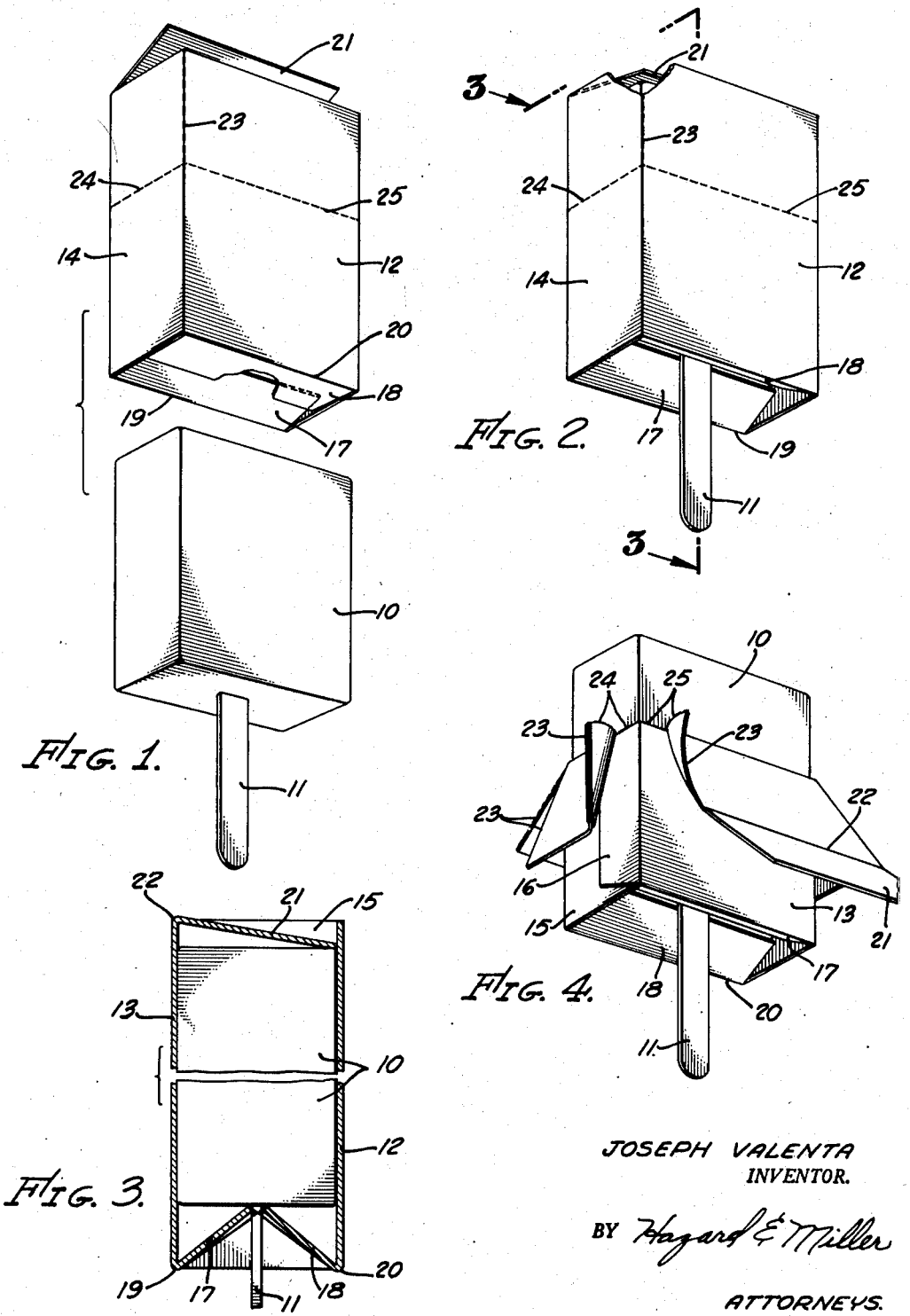

2,627,472

UNITED STATES PATENT OFFICE 2,627,472

FROZEN CONFECTION PACKAGE AND CONTAINER THEREFOR

Joseph Valenta, Los Angeles, Calif.

Application July 17, 1951, Serial No. 237,205

7 Claims. (Cl. 99—180)

This invention relates to a frozen confection package and to a container for confections.

Many confections are made consisting of a body of edible substance mounted on a stick handle such as, for example, the conventional lollypop. Other confections of the frozen type consist of a body of ice cream, sherbet, or the equivalent, frozen onto a stick handle.

A primary object of the present invention is to provide a container which can be easily, quickly and economically manufactured and which is so designed that it may be very readily set up to receive a confection of this type. The container is so designed as to facilitate the insertion of the confection into the container and to automatically lock the confection therein. The locking means is so designed as to not only lock the confection in the container but to serve also as a drip catcher for catching drips from the sides of the body of edible substance if the edible substance is frozen but commences to melt in the course of its consumption.

Another object of the invention is to provide as a new article of manufacture a confection package wherein the confection has its body of edible substance housed within a tubular container severable upon weakened lines and wherein the confection is locked against withdrawal through the bottom of the container by flaps which may function as drip catchers in the event that the body of edible substance commences to melt. The package also has on the container a cover that can be easily and quickly closed and which is self-locking in closed position.

With the foregoing and other objects in view, which will be made manifest in the following detailed description and specifically pointed out in the appended claims, reference is had to the accompanying drawings for an illustrative embodiment of the invention, wherein:

Figure 1 is an exploded view illustrating a confection about to be inserted into a container embodying the present invention;

Fig. 2 is a perspective view illustrating the confection as having been inserted into the container;

Fig. 3 is a sectional view taken substantially upon the line 3—3 upon Fig. 2; and Fig. 4 is a perspective view taken from the opposite corner of the package from that shown in Fig. 2 and illustrating the manner in which the package may be severed in the course of consumption in the confection.

Referring to the accompanying drawings wherein similar reference characters designate similar parts throughout, 10 indicates a body of edible substance mounted on a stick handle 11. In confections of this type a portion of the stick handle 11 is inserted into the edible substance 10 prior to solidification of the edible substance. If the edible substance happens to be candy, that is solid at normal temperatures, the handle 11 is inserted therein while the edible substance is still molten. On the other hand, if the edible substance 10 is of the frozen type such as ice cream or sherbet, the handle 11 is inserted therein prior to freezing solid. In either event the edible substance becomes firmly attached to that portion of the handle 11 that is embedded therein.

The container embodying the present invention is preferably made of cardboard, paperboard, or equivalent material. A blank of such material is died out from sheet stock to provide two opposed side walls 12 and 13 and two opposed end walls 14 and 15. The side wall 13 has a gluing flap 16 integral therewith which is extended over the end wall 15 and attached thereto as by gluing. In this manner the side walls, end walls and glue flap collectively form a tubular type of paper box of length, width and height capable of receiving the body 10. At the bottom of the side walls there are integral therewith two opposed bottom flaps 17 and 18 that are foldable inwardly along fold lines 19 and 20 respectively at the bottoms of the side walls. These flaps 17 and 18 have lengths approximately equal to the widths of their respective side walls. The widths of the flaps 17 and 18 are slightly greater than one-half the distance between the side walls 12 and 13. A cover flap 21 is provided that is foldable inwardly about a fold line 22 at the top of one of the side walls. This cover flap is integral with its respective side wall and has a width slightly greater than the distance between the side walls. The body of the container is divided by perforated lines 23 arranged at each corner. These lines extend from the top of the container downwardly to a point where they may intersect horizontal perforated lines 24 and 25 on the end walls and side walls respectively.

The improved container can be manufactured and assembled by any conventional box making machine designed to make tubular boxes. The blank for the box may be died out from sheet stock and the perforated lines 23, 24 and 25 can be cut into the stock as part of the dieing operation. The box blank may then be folded into the form of a tube and the glue flap 16 attached to the end wall 15. Usually in tubular boxes of this type after the glue flap has been attached the tube is flattened or collapsed to occupy a minimum amount of space during shipment and storage.

When it is desired to fill the container with a confection the container is grasped and compressed to restore its tubular shape. As part of the same operation the two bottom flaps 17 and 18 are folded inwardly towards each other somewhat as illustrated in Fig. 1. At the same time the cover flap 21 may be folded inwardly toward the opposed side wall 12. The body of the confection is then forced into the container through the bottom thereof and in so doing the bottom flaps 17 and 18 are swung inwardly and may occupy temporary positions lying against the inner faces of the side walls 12 and 13 to which they are attached. After the bottom of the body 10 of the confection has passed the edges of the bottom flaps the inherent resiliency of the paper stock causes these flaps to tend to return or to swing downwardly. This downward swinging movement of these flaps is arrested by their edges engaging the sides of the handle 11, as shown in Fig. 3. The cover flap 21 may then be pressed downwardly forcing the body 10 of the confection down into engagement with these upwardly and inwardly inclined bottom flaps 17 and 18. The positions of the bottom flaps 17 and 18 are such that they effectively form a lock limiting downward movement of the confection and preventing its withdrawal through the bottom of the container. As the cover flap 21 is slightly greater in width than the distance between the opposed side walls it is necessary to flex or spring the cover flap slightly to cause it to enter the top of the tubular container. However when it is once sprung through its horizontal position by reason of its excess width its edge will engage the interior face of the opposed wall 12 and be frictionally retained therein.

In the above described manner it will be appreciated that the container embodying the present invention can be made on conventional paper box making machinery, that it can be shipped and stored in a flattened or collapsed condition and at the time of packaging the confection the container can be quickly set up and the confection forced therein between the bottom flaps 17 and 18. When the confection is within the container it is automatically locked therein against withdrawal through the bottom by the bottom flaps 17 and 18 and it is retained in the container against escape through the top in the course of handling by the frictional engagement between the edge of the cover flap 21 and the opposed wall 12. At the time of consumption of the confection the side walls and end walls may be separated on the vertical perforated lines 23 at each corner of the box and the upper portions of the side walls and end walls may be torn off or folded downwardly on the lines 24 and 25 somewhat as depicted in Fig. 4. The protruding or exposed portion of the body 10 may then be eaten and as this portion is consumed the lower portion of the body 10 may be pushed upwardly from within the container by merely pushing the handle 11 upwardly and holding the container stationary. If the confection is of the frozen type it may commence to melt in the course of consumption. Drips from the confection are effectively caught on the bottom flaps 17 and 18 and are retained within the container above the fold lines 19 and 20, it being borne in mind that the flaps 17 and 18 are in length substantially equal to the lengths of their respective side walls so that they extend from end wall to end wall of the container.

From the above described construction it will be appreciated that an improved container is provided for handled confections, that the container is so designed that it may be easily and economically manufactured and at the time of packaging, the container may be easily and quickly set up. The insertion of the confection into the container is greatly facilitated and when the confection is in position therein it is automatically locked against escape through the bottom by locking flaps which ultimately also function as drip catchers. While the container will adequately protect the confection during handling it may be readily opened to expose the confection and facilitate the consumption of the confection.

Various changes may be made in the details of the construction without departing from the spirit and scope of the invention as defined by the appended claims.

I claim:

1. A container for frozen confections comprising a tubular body within which the body of a confection is receivable, and flaps on the bottoms of the sides of the tubular body foldable inwardly towards each other, said flaps being greater in width than one-half of the distance across the body so as to assume upwardly and inwardly inclined positions within the tubular body lying with their edges in engagement with the handle of the confection positioned therein.

2. A container for frozen confections comprising a tubular body within which the body of a confection is receivable, and flaps on the bottoms of the sides of the tubular body foldable inwardly towards each other, said flaps being greater in width than one-half of the distance across the body so as to assume upwardly and inwardly inclined positions within the tubular body lying with their edges in engagement with the handle of the confection positioned therein, the upper portion of the body of the container being divisible upon readily separable lines.

3. A container for frozen confections comprising a tubular body within which the body of a confection is receivable, flaps on the bottoms of the sides of the tubular body foldable inwardly towards each other, said flaps being greater in width than one-half of the distance across the body so as to assume upwardly and inwardly inclined positions within the tubular body lying with their edges in engagement with the handle of the confection positioned therein, and a cover flap on the top edge of one wall of the tubular body, said cover flap being slightly greater in width than the distance across the container so that in folding it inwardly it may be flexed and sprung into the tubular body and when released it will have its edge engage the opposite wall below the top edge thereof and be retained in closed position thereby.

4. A confection package comprising a body of edible substance mounted on a stick handle and a container therefor comprising a tubular body in which the edible body is disposed and from the bottom of which the stick handle protrudes, flaps on opposed sides of the tubular body folded inwardly and assuming upwardly and inwardly inclined positions within the body engaging the stick handle, each flap being slightly greater in width than one-half the distance between the opposed sides.

5. A confection package comprising a body of edible substance mounted on a stick handle and a container therefor comprising a tubular body in which the edible body is disposed and from the bottom of which the stick handle protrudes, flaps on opposed sides of the tubular body folded inwardly and assuming upwardly and inwardly inclined positions within the body engaging the stick handle, each flap being slightly greater in width than one-half the distance between the opposed sides, and a cover flap on the top of one of the side walls of the container foldable over the top of the edible body.

6. A confection package comprising a body of edible substance mounted on a stick handle and a container therefor comprising a tubular body in which the edible body is disposed and from the bottom of which the stick handle protrudes, flaps on opposed sides of the tubular body folded inwardly and assuming upwardly and inwardly inclined positions within the body engaging the stick handle, each flap being slightly greater in width than one-half the distance between the opposed sides, and a cover flap on the top of one of the side walls of the container foldable over the top of the edible body, said cover flap being slightly greater in width than the distance across the top of the container and sloping downwardly slightly from the side of the container to which it is attached into engagement with the opposed wall.

7. A confection package comprising a body of edible substance mounted on a stick handle and a container therefor comprising a tubular body in which the edible body is disposed and from the bottom of which the stick handle protrudes, flaps on opposed sides of the tubular body folded inwardly and assuming upwardly and inwardly inclined positions within the body engaging the stick handle, each flap being slightly greater in width than one-half the distance between the opposed sides, and a cover flap on the top of one of the side walls of the container foldable over the top of the edible body, said cover flap being slightly greater in width than the distance across the top of the container and sloping downwardly slightly from the side of the container to which it is attached into engagement with the opposed wall, the upper portion of the container being divisible upon readily separable lines arranged at the corners of the container and extending across the side and end walls of the container.

JOSEPH VALENTA.

REFERENCES CITED

The following references are of record in the file of this patent:

UNITED STATES PATENTS

| Number | Name | Date |
|---|---|---|
| 2,027,791 | Schrager | Jan. 14, 1936 |
| 2,132,966 | O'Brien | Oct. 11, 1938 |
| 2,450,364 | Smith | Sept. 28, 1948 |